Figure 1:
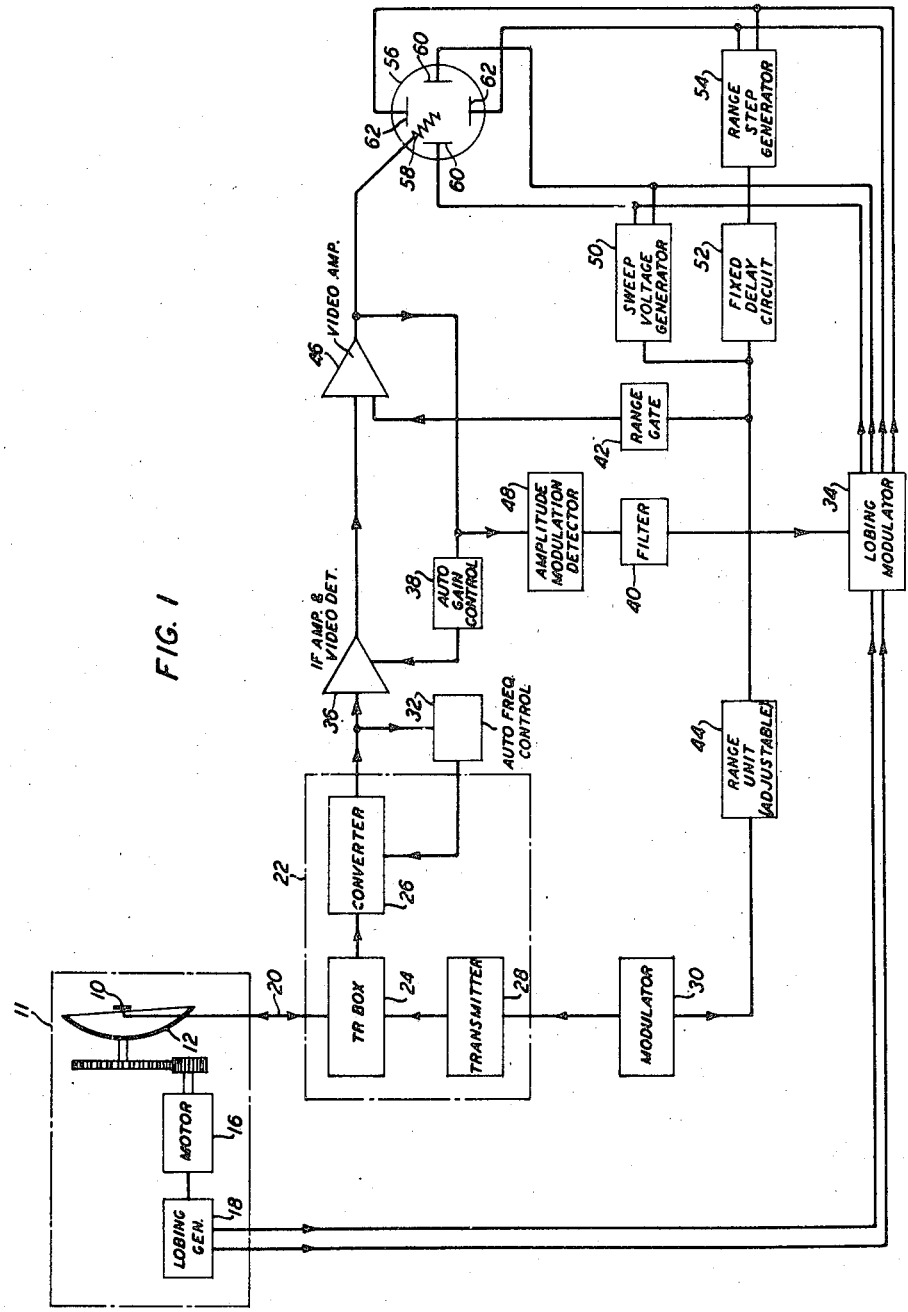

April 12, 1949. K. L. KING ET AL 2,467,319
UNITARY RANGE, AZIMUTH, AND ELEVATION ALIGNMENT
INDICATOR FOR RADAR SYSTEMS
Filed May 2, 1945 2 Sheets-Sheet 1

FIG. I

INVENTORS K. L. KING
W. T. WINTRINGHAM
BY
ATTORNEY

RANGE EXCESSIVE
ELEVATION LOW
AZIMUTH LEFT

RANGE CORRECTED

RANGE CORRECTED
ELEVATION CORRECTED

RANGE ELEVATION
AND AZIMUTH CORRECTED

INVENTORS
K. L. KING
W. T. WINTRINGHAM
BY
ATTORNEY

UNITED STATES PATENT OFFICE 2,467,319

UNITARY RANGE, AZIMUTH, AND ELEVATION ALIGNMENT INDICATOR FOR RADAR SYSTEMS

Kenneth L. King, Mountain Lakes, and William T. Wintringham, Chatham, N. J., assignors to Bell Telephone Laboratories, Incorporated, New York, N. Y., a corporation of New York Application May 2, 1945, Serial No. 591,504

2 Claims. (Cl. 343—11)

This invention relates to object detecting systems employing energy reflection and adapted for radar bombsight, or gun and searchlight directing services and the like. More particularly, it relates to the improvement of such systems to the end that the simultaneous precise alignment of the system in range, elevation and azimuth with respect to a selected target will be facilitated.

In systems of this general class in the prior art it has been customary to display the range indications upon one indicating device (usually a cathode ray oscilloscope) and to display elevation and azimuth (directional) indications upon at least one and in some cases two additional indicating devices. This necessitates continuously checking the indications on at least two, and frequently on three, indicating devices, in order to be certain that the object detecting system is maintained so as to provide accurately the range, elevation and azimuth of a selected target.

Since these systems are commonly employed to facilitate precision bombing from a rapidly moving aircraft or to follow such rapidly moving and elusive targets as modern military aircraft the provision of a system which will present on a single indicator, a simple readily interpretable unitary indication showing at a glance whether the system is accurately adjusted in range, elevation and azimuth with respect to a specific selected target represents an important advance in the art. The arrangements of the invention are also highly desirable for use in civilian aircraft radar navigational systems, since, for such systems it is not usually practicable to provide additional crew members to operate the radar equipment and the normal crew members have many other indicating devices to which they must also devote attention.

It is therefore the primary object of this invention to provide an object detecting system which will provide a simple, readily interpretable, unitary indication of whether or not the system is accurately adjusted to the range, elevation and azimuth of a specific selected target.

In an illustrative system of the invention to be described hereinafter, the desired objective is obtained by superimposing a range trace of the type having a range step, upon a "spot" indication of the type normally shown on a combined train (azimuth) and elevation (directional) indicator commonly employed in modern "gun pointing" object detecting systems, such for example, as that disclosed in copending application of O. E. De Lange, Serial No. 504,577, filed October 1, 1943, assigned to applicants' assignee. This application has matured into United States Patent 2,426,182, granted August 26, 1947. The position of the range step with respect to the signal indication will then show whether the range setting is correct and at the same time the position of the signal indication with respect to the screen center will indicate whether the adjustments of train (azimuth) and elevation angles are correct with respect to the selected target. As is well known in the art, and as is illustrated and explained in the above-mentioned application of O. E. De Lange, a "range trace" is a line traced by the ray of the oscilloscope indicator of a pulse-reflection type range determining system, the ray being synchronized to start the trace at a predetermined instant with respect to the instant of emission of an exploratory energy pulse and to traverse the path of the trace in accordance with a predetermined time schedule, such, for example, as a linear law of variation with time, whereby the position of the ray at any instant along the trace corresponds to a definite predetermined range. To facilitate range measurements, it is common practice in the art to provide apparatus which produces a range index or "range step," which is simply a definite, readily identifiable, discontinuity in the range trace, such as a small vertical step, the position of which along the trace is controlled by the adjustment of the range unit. As is well known in the art, a range unit is a continuously adjustable delay device having a calibrated dial or counting mechanism associated therewith, arranged to provide the range directly in convenient units, such as yards. The range unit functions to delay a pulse obtained from the circuit which pulses or activates the transmitter. The delay pulse may be used directly as a range index or, alternatively, can control the formation of a range step of any desired character. Whatever form of range index is employed, it can be brought, by adjustment of the delay of the range unit, into a definite predetermined time relation (usually into substantial coincidence) with respect to the indication resulting from receipt of reflected exploratory pulses from any selected reflecting object. The range of the selected object can then be read directly from the above-mentioned calibrated dial or counting mechanism of the range unit, and the ranging system is then said to be "in alignment" with the selected object.

Other objects and advantages of the invention will become apparent during the course of the following description of an illustrative system of the invention and from the appended claims.

The principles of the invention will be more readily understood in connection with the following detailed description of a preferred illustrative embodiment thereof, shown on the accompanying drawings in which:

Fig. 1 shows in block diagram form a system illustrative of the invention; and

Figs. 2 to 5 inclusive show typical range and directional indications on the indicator of the system of Fig. 1 and illustrate one sequence of steps which may be taken to effect the proper final alignment of the system.

In more detail in Fig. 1, modulator 30 provides short, squared-top, high voltage pulses to radio transmitter 28, causing it to generate similar short pulses of radio frequency energy. These latter pulses pass, through TR (transmit-receive) box 24 and transmission line 20, to antenna feed and pick-up device 10, which projects them against paraboloid reflector 12 from which they are reflected in a highly directive beam to strike remote objects within the path of the beam in accordance with standard radar technique now well known to those skilled in the art.

TR box 24 is preferably of the well known resonant cavity type having a gas tube connected across points of substantially different potential, the cavity being effectively in shunt across the input to converter 26. The high-power pulses from the transmitter then serve to break down the gas tube thus effectively shorting the input circuit to converter 26 and protecting it from the transmitter energy. Upon the cessation of each transmitted pulse the gas tube recovers substantially instantaneously leaving the converter 26 fully sensitive to the relatively feeble received reflections of the transmitted pulse.

Antenna feed and pick-up device 10 is preferably of the horn type of radio wave projector. Alternatively it can be a small dipole antenna equipped with a small reflector to direct the radiated energy toward the reflector 12. It should be located at the focal point of reflector 12, on the normal axis of the reflector.

Reflector 12 is tilted slightly from its normal axis and is nutated about its normal axis by rotation substantially as shown in United States Patent 2,083,242, issued June 8, 1937, to W. Runge, Fig. 2. Motor 16 provides the power for effecting rotation of antenna reflector 12 at a convenient speed, for example, at 30 cycles per second.

Motor 16 also drives a two-phase sine wave generator 18, known in the art as a lobing generator when used as shown in Fig. 1, since the phases of the sine waves generated are employed, as will presently appear, to indicate at any instant the position of the antenna lobe.

The antenna system 11, including the motor 16 and lobing generator 18, is preferably mounted so that it can be turned in azimuth and tilted in elevation to detect and follow targets such as aircraft. It can, for example, be mounted as for antenna systems shown in Patent 2,231,929 to J. Lyman, issued February 18, 1941.

Received reflected pulses, i. e., echoes of the transmitted pulses resulting from reflection by the object or objects to be detected and located, are directed to device 10 by reflector 12 and follow transmission line 20 to TR box 24. Those returning during the intervals that the transmitter 28 is passive, will freely pass through TR box 24 to converter 26.

Converter 26 can be of the vacuum tube type or of the crystal type, both of which are well known in the art. It includes a beating oscillator and converts the radio frequency pulses into a convenient intermediate frequency which is usually less than 100 megacycles. An automatic frequency control 32 is preferably included to slightly vary the beating oscillator frequency so that the resulting intermediate frequency does not sensibly change even though the frequency of the transmitter 28 should drift slightly from its normal frequency. Such arrangements are of course well known in the art. It is, of course, not essential.

The intermediate frequency is then amplified in amplifier 36 and detected to obtain the video frequency. The latter frequency is further amplified in video amplifier 46, the output of which is applied to the control electrode 58 of cathode ray oscilloscope 56. This arrangement, of course, results in the intensity modulation of the ray, i. e., the production of a momentary increase in the brilliance of the ray, at the moment a video signal is impressed upon electrode 58.

A portion of the output energy of amplifier 46 is fed back through a conventional automatic gain control circuit 38 to control the gain of the I. F. amplifier 36 and a second portion of the output of amplifier 46 is furnished to amplitude modulation detector 48 for purposes to be described presently.

Amplifier 46 is also preferably "gated," i. e., permitted to transmit only the reflected signal or signals which arrive back at the antenna within a predetermined time interval which is predeterminedly adjustably by the following circuit.

A portion of the energy pulses from modulator 30, which serve to energize transmitter 28 as described above, is also provided to range unit 44. The range unit is adjustable to delay the pulses from modulator 30, by a time interval which can be varied between that corresponding to the receipt of energy reflections from an object at the shortest range to be measured to that corresponding to the receipt of energy reflections from an object at the longest range to be measured by the system and in conjunction with range gate circuit 42, provides at the output of circuit 42, a squared-top pulse the center point of which corresponds to the reading of the range as shown on calibrated counter dials which turn as the range unit is adjusted.

The width of the squared-top pulse is such that it corresponds to a small portion only, of the total range to be measured by the system. For example, many systems of the general type illustrated in Fig. 1 are designed to measure ranges up to 40,000 yards maximum and for these, a range gating pulse of approximately 2,000 yards (about 10 microseconds) has been found suitable.

It is obvious that the arrangements just described permit the selection of any portion of approximately 2,000 yards in width, for example, of the total range by simply adjusting the range unit to cause the range gating pulse to occur at the position corresponding to the desired portion.

The pulse from range unit 44 is furnished to three units namely, the range gate circuit 42 which can be a conventional multivibrator circuit providing the above-mentioned squared top pulse in response to the receipt of each of the delayed pulses from modulator 30, via range unit 44, the sweep voltage generator 50 and the fixed delay circuit 52.

The squared top pulse from the range gate circuit 42 furnishes a bias to video-amplifier 46 which overcomes a blocking bias in a grid-cathode circuit of the amplifier. This permits reflected signals coincident in time with the pulse from range gate circuit 42 to pass through and be amplified by amplifier 46, other pulses being excluded because the amplifier 46 is normally blocked. Such arrangements are, of course, well known in the art.

The sweep voltage generator 50 responds to the pulse from range unit 44 by generating a sweep voltage, preferably of the well-known linear "sawtooth" type, which is applied as shown in Fig. 1 to the horizontal deflecting plates 60 of oscilloscope 56 and produces a horizontal sweep, or trace, the duration of which corresponds to the width of the pulse provided by range gate circuit 42 (usually about 2,000 yards) the center point of the sweep corresponding to the range registered on the calibrated counter dials of the range unit as previously described.

Fixed delay circuit 52 introduces a time delay precisely equal to half the length of the pulse provided by gate circuit 42, the output of delay circuit 52 being connected to range step generator 54.

Range step generator 54 responds to the leading edge of the pulse received from unit 44 by way of delay circuit 52 and provides a range step, or sharp vertical step, as an index mark, in the horizontal range trace, when its output is impressed, as shown in Fig. 1 across the vertical deflecting plates 62 of oscilloscope 56. Any other well defined discontinuity in the trace, such as a notch or pedestal superimposed upon the range trace could, obviously, serve as an index mark. The simple vertical step, however, lends itself very well to the purposes of the invention, as will become apparent hereinunder. Range step generator 54 can be any one of the numerous electronic voltage step-generating circuits well known to those skilled in the art. By way of example, it can be of the form shown and described in detail in the application Serial No. 491,791, filed June 22, 1943, by L. A. Meacham, circuit 28 of Figs. 1 and 3.

Meachan's application has matured into United States Patent 2,422,204, granted June 17, 1947. The output of the amplitude modulation detector 48 is passed through a filter 40 the function of which is to select the lobing frequency, i. e., the frequency of the amplitude modulation of the received reflected pulses if the target from which reflections are being received is not precisely on the axis of the antenna system as described above. This frequency is, of course, determined by the rate at which the reflector 12 is nutated and is commonly 30 cycles per second so that filter 40 should freely pass 30 cycles per second, for example, and exclude all other frequencies.

The output of filter 40, together with the two-phase output of lobing generator 18 are furnished to lobing modulator 34. The two-phase output of generator 18 comprises, as mentioned above, two sine waves, mutually in quadrature, i. e., displaced 90 degrees in phase with respect to each other, and definitely related at any instant to the angle of reflector 12. The frequency of these sine waves and the frequency of the amplitude modulation are, as previously mentioned, the same as the frequency of the nutation cycle of reflector 12. The phase of the amplitude modulation, however, is determined by the direction in which a specific reflecting object is displaced with respect to the normal axis of the antenna system. Hence its phase can obviously be employed to indicate the direction in which the axis of the antenna system must be moved to bring it into alignment with the object. Generator 18 is initially positioned so that one phase reaches its maximum value of one polarity when the nutation of reflector 12 has displaced the antenna lobe to its maximum vertical angle, then the maximum value of the opposite polarity of that phase will correspond to the minimum vertical angle of the lobe and the other phase will have a maximum value of one polarity for the maximum lobe angle to the right and a maximum value of the other polarity for the maximum lobe angle to the left.

Figure 4:
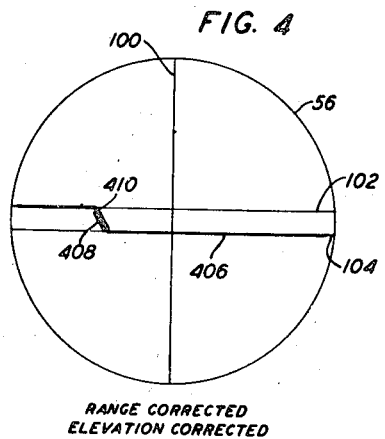
Figure 5:
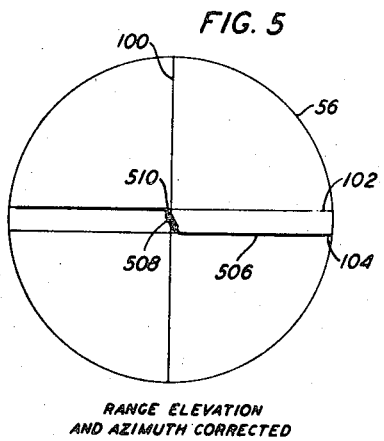

Each phase of the generator 18 is then compared with the phase of the amplitude modulation passing through filter 40 by lobing modulator 34 which can be of the type described in detail and shown in Fig. 4 of the above-mentioned application of O. E. De Lange and which employs for each of the two necessary phase comparisons a standard balanced phase modulator. That is, lobing modulator 34 comprises two standard balanced phase modulators which provide in a manner well known to the art and as described in detail in the De Lange application mentioned above, two voltages, one indicative of the phase relation between the amplitude modulation and one phase of generator 18 and the other indicative of the phase relation between the amplitude modulation and the other phase of generator 18. One of these voltages resulting from the combination of the amplitude modulation and the generator phase aligned with the vertical deflection of the lobe can then be impressed on the vertical deflecting plates 62 of oscilloscope 56 and the other can be impressed on the horizontal deflecting plates 60 of oscilloscope 56, as shown in Fig. 1.

Assuming for the moment that sweep generator 50 and step generator 54 are turned off, but the remainder of the system is operating and that deflections are being received from an object which is slightly displaced from the normal axis of the antenna system a so-called "spot indication" will result, the spot being displaced from the center point of the oscilloscope at an angle corresponding to the direction in which the object is displaced from the normal antenna axis and at a distance which is substantially proportional to the amount the object is displaced.

If the sweep and step generators 50 and 54 are then turned on, a range trace with a range step in the center thereof will be added on the oscilloscope screen and the spot will be elongated horizontally because of the lateral sweep of the range trace. The position of the elongated spot on the range trace with respect to the range step will indicate whether the range unit has been adjusted properly to provide an accurate reading of the range of the object from which the reflections are being received. The entire range trace will, of course, be displaced by the voltages provided by modulator 34 in the event that the object is not on the normal axis of the antenna system as described above.

A number of illustrative oscilloscope indications for the system of Fig. 1 are shown in Figs. 2 to 5 inclusive and will be discussed below.

A range unit which also includes a gating pulse circuit and a range step generating circuit, all of which are suitable for use in the above system is, for example, described in detail in the aforementioned copending application, Serial No. 491,791, filed June 22, 1943, by L. A. Meacham, assignor to applicants' assignee and a number of other equivalent arrangements are well known to those skilled in the art.

A complete object locating system describing in detail a suitable lobing modulator and illustrating a simple "spot indicating" oscilloscope is described in detail in the aforementioned copending application, Serial No. 504,577, filed October 1, 1943, by O. E. De Lange, assignor to applicants' assignee. The De Lange application also discloses a simple "class A" indication and apparatus for obtaining it, which is of interest in that it illustrates the use of a range trace having a range step. The so-called "class A" indication comprises a simple horizontal trace on the oscilloscope along which a range step can be moved, by adjustment of the range unit, until the range step is aligned with the leading edge of a target indication of interest. The target indications in the system disclosed by De Lange comprise, for the "class A" presentation, vertical "pips" or deflections caused by impressing the received reflected pulses upon the vertical deflecting plates of the oscilloscope.

An objection to the system disclosed in the De Lange application is that two oscilloscopes must be watched in order to determine whether the object detecting system is precisely aligned in range and direction with respect to a particular selected reflecting object.

Applicants' system, as will appear from the following description of Figs. 2 to 5 inclusive provides, upon a single oscilloscope, a unitary indication from which alignment, or lack of it, in both range and direction are immediately apparent.

Figure 2:
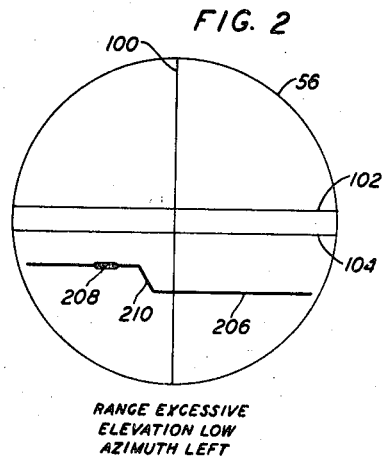

In Fig. 2, elongated bright spot 208 appears on range trace 206, which trace includes range step 210. Vertical center line 100 represents the position of the normal antenna axis in azimuth and horizontal lines 102, 104 represent the positions which should be assumed by the upper and lower portions of the range trace, respectively, when the reflecting object is in the same vertical plane as the normal antenna axis.

Figure 3:
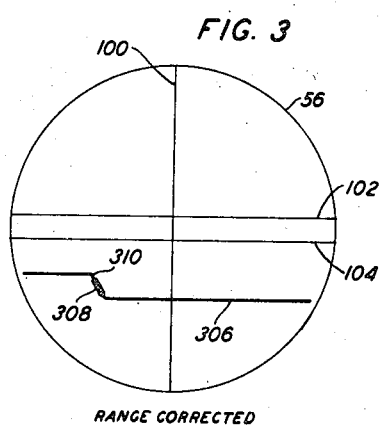

To correct the range setting the range unit is adjusted until the elongated indication coincides with the range step as shown in Fig. 3 where 308 and 310 represent the desired coincidence, 306 being the range trace.

To correct the elevation the normal antenna axis is depressed until the upper and lower portions of the range trace 406 are coincident with lines 102 and 104 respectively as illustrated in Fig. 4.

Finally to correct the azimuth alignment the normal antenna axis is turned to the left until the vertical center line bisects the elongated indication 508 and the range step 510 which were previously brought into coincidence as described above.

Obviously, the corrections described above can be performed in any order desired, the above sequence being entirely fortuitous and illustrative only. Also, where as is sometimes the case, three operators are assigned, one each, to maintain the range, the azimuth and the elevation, respectively, of an object detecting system in alignment with a rapidly moving target, such as an aircraft, applicants' arrangement permits all three operators to make their adjustments simultaneously without delaying or interfering in any way with each other. Many prior art object detecting systems require that the range operator align the target in range before the azimuth and elevation operators can begin their adjustments. This is satisfactory for distant and slowly moving targets but the delay entailed, though only momentary, may prove disastrous in anti-aircraft defense.

Alternatively, where a single operator must maintain alignment in range, azimuth and elevation the unitary indication provided by applicants' arrangements greatly reduces the difficulties with which he must cope since he need not shift his attention from one indication to another.

Numerous other arrangements within the spirit and scope of the invention will occur to those skilled in the art.

The invention is defined in the following claims.

What is claimed is:

1. In a radio energy reflection object detecting and ranging system of the type employing an antenna adjustable in azimuth and elevation and having a highly directive pulsed beam, the axis of said beam being displaced by a small angle with respect to the normal axis of said antenna system, means for rotating the axis of said beam about the normal axis of said antenna at a substantially constant low frequency rate, means for generating locally two sine waves having the same low frequency as that of the beam rotation, said two sine waves being displaced 90 degrees in phase with respect to each other and definitely related in phase to the vertical and horizontal motions of said beam respectively, means for receiving and detecting reflections of said beam from remote objects, means for detecting and segregating amplitude modulation of said received reflections of the said low frequency, means for separately combining said amplitude modulation frequency voltage with each of said two sine wave voltages and obtaining two voltages indicative of the phase relations between said combined voltages and the amplitude of said amplitude modulation voltage, a cathode ray indicator having ray intensity controlling means connecting to the output of said receiving means, and horizontal and vertical deflecting means, said two voltages, indicative of the phase relations, being impressed upon said horizontal and said vertical deflecting means, respectively, means for generating a linear range sweep voltage synchronized with the emission of pulses by said system, said range sweep voltage being impressed upon said horizontal deflecting means to establish a range trace on the screen of said oscilloscope, means for generating a range step voltage synchronized to coincide with the center point of said range trace, said range step voltage being impressed upon said vertical deflecting means, and means for adjusting the phase relation of said linear range sweep and said range step voltage to bring said range step into time coincidence with an indication on said oscilloscope screen resulting from the reception of reflected pulses from a reflecting object whereby when said indication is centered on said range step and said range step is centered on the screen of said oscilloscope a unitary positive indication that the system is aligned on said reflecting object in range, azimuth and elevation is obtained.

2. In a pulse-reflection object-detecting and ranging system, means adjustable in azimuth and elevation for emitting a highly directive beam of energy pulses, means for receiving reflections of said pulses from an object within the region throughout which the beam is projected at each instant, means for rotating the axis of said beam regularly about a reference axis, said beam axis being maintained at a constant small angle of less than five degrees with respect to said reference axis during said rotation, means for generating two sine waves having a phase difference of 90 degrees and a frequency equal to that of the rotation of said beam axis, means for detecting amplitude variations of the received reflected pulses, means responsive to said two sine waves and said detected amplitude variations to provide two voltages representing deviation of said reference axis from the said reflecting object in two orthogonally related directions, respectively, a cathode ray oscilloscope having a ray intensity control means connecting to the output of said receiving means and horizontal and vertical deflecting means, said two voltages, representing deviation of said reference axis, being impressed upon said horizontal and said vertical deflecting means, respectively, means for generating a linear range sweep voltage synchronized with the emission of pulses by said system, said range sweep voltage being impressed upon said horizontal deflecting means to establish a range trace on the screen of said oscilloscope, means for generating a range step voltage synchronized to coincide with the center point of said range trace, said range step voltage being impressed upon said vertical deflecting means, and means for adjusting the phase relation of said linear range sweep voltage and said range step voltage to bring said range step into time coincidence with an indication on said oscilloscope screen resulting from the reception of reflected pulses from a reflecting object whereby when said indication is centered on said range step and said range step is centered on the screen of said oscilloscope a unitary positive indication that the system is aligned on said reflecting object, in range, azimuth and elevation is obtained.

KENNETH L. KING.
WILLIAM T. WINTRINGHAM.

REFERENCES CITED

The following references are of record in the file of this patent:

UNITED STATES PATENTS

| Number | Name | Date |
|---|---|---|
| 2,405,591 | Mason | Aug. 13, 1946 |
| 2,416,591 | Muntz et al. | Feb. 25, 1947 |
| 2,427,905 | Fyler | Sept. 23, 1947 |
| 2,436,655 | Locke | Feb. 24, 1948 |

FOREIGN PATENTS

| Number | Country | Date |
|---|---|---|
| 552,072 | Great Britain | Mar. 22, 1943 |
| 555,052 | Great Britain | Aug. 3, 1943 |